Figure 1:
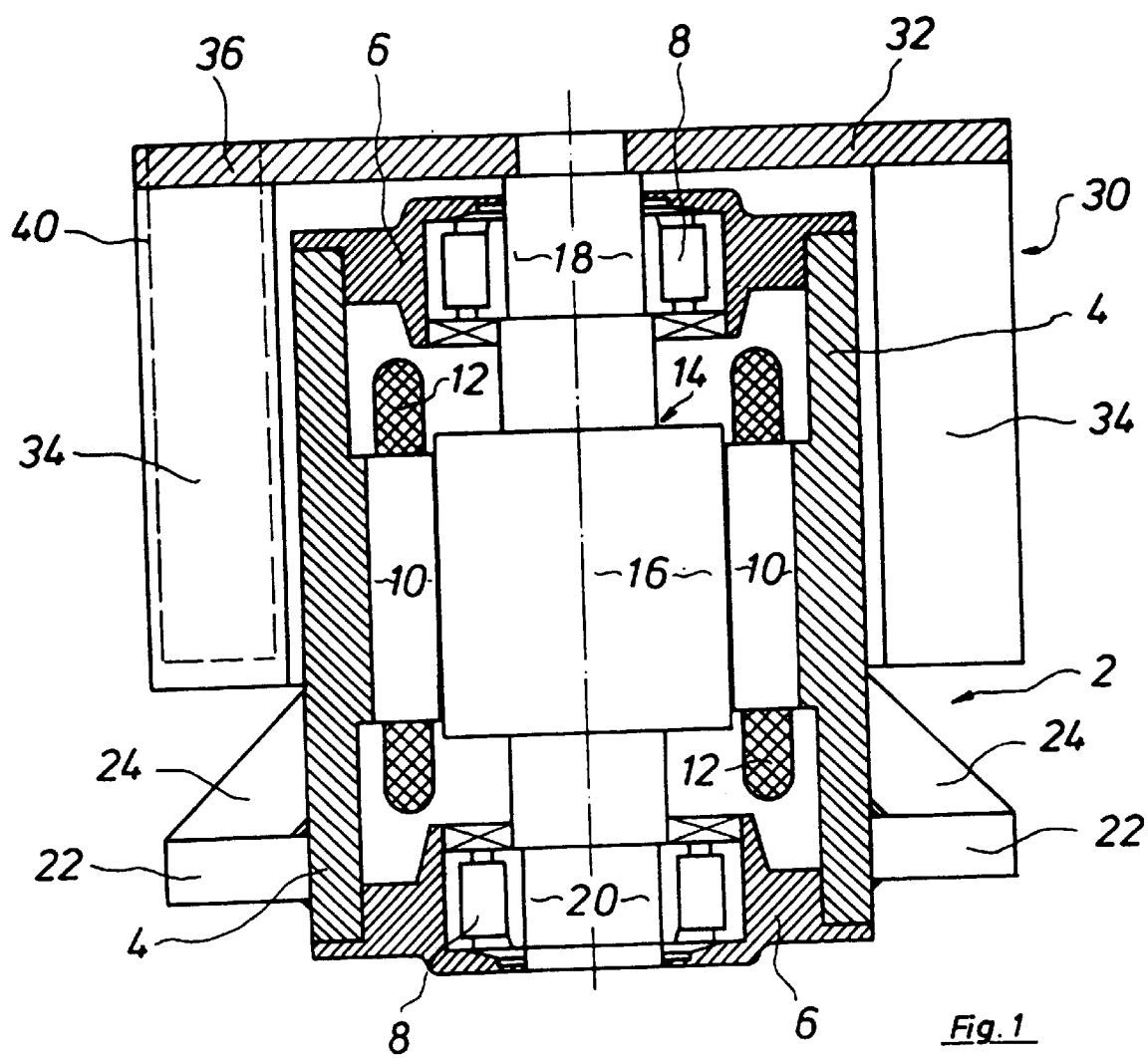

United States Patent

Kroger

[11] Patent Number: 5,850,110
[45] Date of Patent: Dec. 15, 1998

[54] UNBALANCED MASS VIBRATION GENERATOR

[75] Inventor: Dietrich Kroger, Wiesbaden, Germany

[73] Assignee: Netter GmbH, Mainz-Kastel, Germany

[21] Appl. No.: 653,541

[22] PCT Filed: Sep. 23, 1995

[86] PCT No.: PCT/EP95/03773

§ 371 Date: May 24, 1996

§ 102(e) Date: May 24, 1996

[87] PCT Pub. No.: WO96/10285

PCT Pub. Date: Apr. 4, 1996

[51] Int. Cl.$^6$ .............................. B01F 11/00; H02K 7/14
[52] U.S. Cl. ............................... 310/81; 74/87; 209/367; 366/128
[58] Field of Search .................................. 310/81; 74/87, 74/61; 366/128; 209/366.5, 367; 198/770

[56] References Cited

U.S. PATENT DOCUMENTS

| 3,385,253 | 5/1968 | Mathey ........................................ 440/86 |
| 3,919,575 | 11/1975 | Weber et al. .............................. 310/81 |
| 5,107,155 | 4/1992 | Yamaguchi ................................ 310/81 |
| 5,220,846 | 6/1993 | Niklewski ................................... 74/87 |
| 5,392,898 | 2/1995 | Burgess et al. .......................... 198/750 |

FOREIGN PATENT DOCUMENTS

| 276891 | 3/1969 | Austria . |
| 400390 | 9/1924 | Germany . |
| 900516 | 12/1953 | Germany . |
| 2200170 | 7/1972 | Germany . |
| 4116060 | 11/1991 | Germany . |
| 4049831 | 2/1992 | Japan . |
| 2001732 | 7/1977 | United Kingdom . |

Primary Examiner—Thomas M. Dougherty
Assistant Examiner—Judson H. Jones
Attorney, Agent, or Firm—Paul & Paul

[57] ABSTRACT

An electric motor-driven unbalanced vibration generator with an electric motor which is enclosed in a motor housing and the extended motor shaft of which is provided with at least one unbalanced body which can rotate and which is provided in a region which lies radially outside of a radial segment of the unbalanced body, with an additional segment which extends over the motor housing and which can rotate around it. The axial segment of the unbalanced body represents the critical part of the unbalanced mass. As a result of the axial extension of the unbalanced body over the motor housing, and thus the shifting of the center of mass of the unbalanced mass to between the bearings of the motor, a second unbalanced mass at the other end of the motor is no longer necessary. In addition, as a result of the outside radial position of the main segment of the unbalanced body, the unbalanced mass can easily be changed by means of additional masses which can be inserted into the segment and removed from it.

12 Claims, 3 Drawing Sheets

UNBALANCED MASS VIBRATION GENERATOR

The invention pertains to a motor-driven, unbalanced mass vibration generator in accordance with the introductory clause of Patent Claim 1.

As a rule, such unbalanced mass vibration generators are provided with electric motor driving means. They are also known as electric unbalanced motors because—in a way similar to the analogous expression "back-geared motors"— they are generally implemented as compact modular units, in the housing extensions of which the unbalanced masses are generally integrated like the gearset of a back-geared motor. They are also known as flange vibrators because the housing is generally provided with a mounting flange by means of which the compact modular unit can be mounted on the machine or apparatus which is to be placed into oscillating motions with the aid of the vibration generator.

Unbalanced mass vibration generators of the type under discussion here often work in a rotational speed range of up to 25 Hz. Often, it is also required that the working moment, or more specifically, the effective unbalanced mass, can be changed. For this purpose in particular, known unbalanced mass vibration generators exhibit, on each of the journals of a shaft which extends out beyond the motor housing, two-part or multiple-part unbalanced masses which can be locked at different angle of rotation positions relative to one another in order to be able to affect the resulting unbalanced masses in this way. If the two unbalanced masses are equal, they cancel each other out when they are at an angular position of 180° relative to each other, so that no unbalance arises. If both of the masses are set at the same angular position, the maximum unbalance of the device results. In between, there is a large number of transitional positions possible. For the purpose of a simple structural design, the adjustability of the unbalanced masses with respect to each other is most often configured in such a way that the one part of the unbalanced mass is mounted in a fixed position on the associated journal of the shaft, and only the second part is made so that it can be rotated with respect to the first part, in conjunction with which the mutual locking, for example, between the two unbalanced mass parts, can take place. With adjustability of such a type, the angular placement of the resulting unbalance on the shaft changes with an adaptation of the unbalanced masses, so that in the case of drives with several vibration generators, for example, for directional and synchronized oscillations, the angle of rotation position has to be preset in the synchronization device again. This requires unnecessary effort. For the purpose of achieving as symmetrical a bearing load as possible, known vibration generators are usually provided with unbalanced masses, or more specifically, unbalanced mass pairs, at both ends of the drive motor. This configuration also has the advantage that by means of different unbalanced masses or different positions of the unbalanced masses at both ends, wobbling movements can also be generated.

Examples of the applications of the unbalanced mass vibration generators under consideration here are, for example, polishing machines and deburring devices, in which mechanical parts are processed in a vat, or vibrating screens. In a large number of these application instances, for the generation of oscillations in horizontal planes, the vibration generators are installed with a vertical axis orientation, and specifically, generally underneath the working part of the particular device in question. In an installed position of such a type, after the removal of a protective machine part, the upper unbalanced masses are relatively easily accessible, for example, for the purpose of an adjustment. In the case of the lower unbalanced masses, such accessibility often turns out to be very difficult. Structurally, the accessibility is made even more difficult as a result of the fact that, because of the arrangement of the unbalanced masses on both ends of the shaft, the vibration generators are relatively long, so that the lower unbalanced masses come to be placed in proximity to the base of the machine, or in the case of relatively large devices, for reasons of accessibility of the working regions of these machines, the lower unbalanced masses even have to be sunk into a pit in the floor if a low installed height is required.

The primary task of the present invention is to reduce the overall length or, in the case of a vertical installation, the overall height of unbalanced mass vibration generators of comparable performance. In a preferred form of implementation, what is also being strived for is the possibility of carrying out all of the adjustment work on a vibration generator in a vertical installation from above, possibly following the removal of an upper machine cover panel, in conjunction with which the ability of the moments of unbalance to be changed should, of course, be retained. Finally, with an additional preferred form of implementation, what is being strived for is the ability to carry out the changing of the moments of unbalance in such a way that the resulting angular placement of the unbalanced masses relative to the driveshaft is retained, so that drives with several vibration generators for specially defined oscillation forms do not have to be readjusted after a change in the unbalance.

In the case of a motor-driven unbalanced mass vibration generator of the type described at the beginning, the basic task is carried out in accordance with the invention by means of the characterizing features of Patent Claim 1. A more concrete version of the basic arrangement and form of implementation of the unbalanced masses that are being claimed there is described in Patent Claim 2.

In the case of the known devices, care was, as a rule, taken that the unbalanced masses placed at both ends of the shaft of the drive motor did not exceed the outside girth of the motor, indeed, that their outside diameters even remained below the motor's outside girth so that, for example, it was possible to include the unbalanced masses inside the extended motor housing for reasons of safety, in order to give the structural unit the same maximum circumferential dimensions throughout to the greatest extent possible. In general, this was handled in the same way, even for devices which did not need to have their unbalanced masses enclosed in such a way due to the fact that the vibration generators were being installed in a closed application machinery room.

In the case of known designs, if the outside girth of the motor is exceeded by the unbalanced masses, then the masses have to exhibit a thickness such as is necessary for the specific desired working moment, as a result of which the axial length is then increased correspondingly.

Directly differing from this previous practice, the invention provides for increasing the diameter of the unbalanced masses, and then directing those parts of the unbalanced masses which lie radially outside, the parts which develop the greatest effect as a result of the quadratic distance dependency, back over the motor housing in an axial, relative to the device, extension, and allowing them to rotate around the motor housing. By means of this configuration, a smaller overall length of the vibration generator is achieved directly, since as a result of the greater effectiveness of the segments of the unbalanced masses that lie radially further outside, their radial mounting segments on the bearing journals can be substantially reduced in their dimensions, and can be made appropriately smaller in their axial extension to the dimensions. The diameter of the complete vibration generator does indeed increase as a result of the configuration in accordance with the invention, however, this is not a hindrance in a majority of the applications. An enclosing of the rotating unbalanced masses would also be possible by making use of a wrap-around housing, which could be joined to an extended mounting flange. Since in many applications the vibration generators are used in a room that is closed off, however, in the design in accordance with the invention, an enclosing of the unbalanced masses is generally not necessary.

Even with the design in accordance with the invention, it would, in principle, be possible, as is the case with the known devices, to provide unbalanced masses on both ends of the shaft and to also make them in two parts. Thus, for example, the two-part design could be implemented in such a way that the radial segments of both unbalanced masses are placed one behind the other on the bearing journals, as with the state of the art, but with the axial segments designed so that they are shifted concentrically, relative to each other, in order to make them overlap each other more or less when they are mutually rotated. The axial segments of the unbalanced bodies could be directed backwards from both sides until they are near the longitudinal center of the housing, in conjunction with which there would still have to remain sufficient space in the center of the housing for providing a circumferential flange there for mounting the vibration generator.

The basic configuration in accordance with the invention now offers, however, exactly the critical, additional advantage, that these conventional types of configurations can be dispensed with. First, as a result of the directing of the axial segment of the unbalanced body back over the housing, the bearing loads, through the shaft journals of the rotor, can be reduced in a way that corresponds to that of the known devices, even when an unbalanced body is provided at only one end of the shaft, if the axial part of the unbalanced body is directed far enough back over the housing so that the center of mass, or more specifically, the resulting center of inertia, with the configuration in accordance with the invention as well, comes to lie in a longitudinal plane through the device and between the bearings, and with a corresponding axial extension of the unbalanced body, can even be brought all the way to near the midpoint between the bearings. With a form of implementation such as this, the mounting means on the housing has to be shifted to that end of the housing which faces away from the unbalanced body.

In addition to that, for the ability to change the unbalanced masses, the configuration in accordance with the invention also offers the possibility of being able to dispense with the two-part version in the conventional sense, namely, the mutual ability of two parts to be rotated. As a result, the overall length of the device can be additionally reduced.

Specifically as a result of the fact that, with the configuration in accordance with the invention, the segment of the unbalanced mass which extends in the axial direction has been brought to a relatively greater distance from the axis of rotation of the device, its effect is increased as a result of the quadratic distance dependency, so that in the case of the configuration in accordance with the invention, it is to a considerable extent this axial segment of the unbalanced mass which lies radially outside determines the resulting total unbalance. Changes to this part lying radially outside thus have a correspondingly greater effect on the resulting working moment. For changing the unbalanced mass, in accordance with the invention it is therefore provided that in a preferred form of implementation, there are provided, in the axial segment of the unbalanced mass which lies radially outside, recesses into which additional masses can be inserted as needed. It is beneficial that these recesses run into the axial segment of the unbalanced mass in an axial direction, starting from the end of the vibration generator which lies towards the outside, so that the additional weights can be easily inserted into the unbalanced mass in the axial direction from the outside. When the vibration generator is installed vertically and the unbalanced body lies towards the top, it is not only possible to insert the additional masses into the unbalanced body in a simple manner if accessibility to the device is provided from above, but beyond that, these additional masses also require no special fastening, since as a result of the centrifugal force, they are held in constant contact with the outside wall of the recess in the unbalanced body, and are also unable to move out of the unbalanced body in an upward direction.

It is beneficial that the recesses are configured cylindrically, so that simple, fitting cylindrical bodies can be inserted into these recesses as additional masses. It has proven to be the case that with a special version in accordance with the invention, the working moment can be doubled or halved through the use of this measure. Such a range is generally sufficient. Through the use of inserted bodies of different specific masses, additional adaptation becomes possible.

In order to make the most possible use of such changes of mass, it is beneficial to provide a series of recesses along the segment of the circumference which includes the unbalanced body, so that one or more additional masses can be inserted or removed as desired. In this regard, it is preferable that the recesses be provided symmetrically with respect to the effective center of mass of the unbalance so that additional masses can be inserted or removed in a symmetrical manner as well, in order not to change the angle of the center of mass of the unbalanced body relative to the rotational position of the drive axle, which is what should be strived for.

In the case of a corresponding axial extension of the axial segment of the unbalanced body, with this form of implementation it is also possible to generate wobbling motions through the insertion into the recesses of additional masses which extend only over a specific region of the axial recess. The remaining space can be kept open by means of spacers or something similar.

In a preferred form of implementation with a single unbalanced body which is placed on only one of the shaft journals and provided for vertical installation, a vibration generator of such a type designed in accordance with the invention fulfills all of the requirements pointed out at the beginning. For a vertical installation, the unbalanced body is provided at the upper end of the vibration generator, in conjunction with which the unbalanced body extends downward with its axial segment beyond the longitudinal center of the housing. Accordingly, there are provided at the lower end of the housing and distributed around the circumference, flange-like mounting means, the contact surfaces of which are directed in a downward direction. The fact that there is no unbalanced mass at the lower shaft journal can be utilized for providing an angular position sensor here at the end of the housing in a simple way. In a vibration generator configured in such a way and installed in a vertical position in a working device, all of the adjusting measures on the unbalanced masses can easily be carried out from above.

Figure 2:
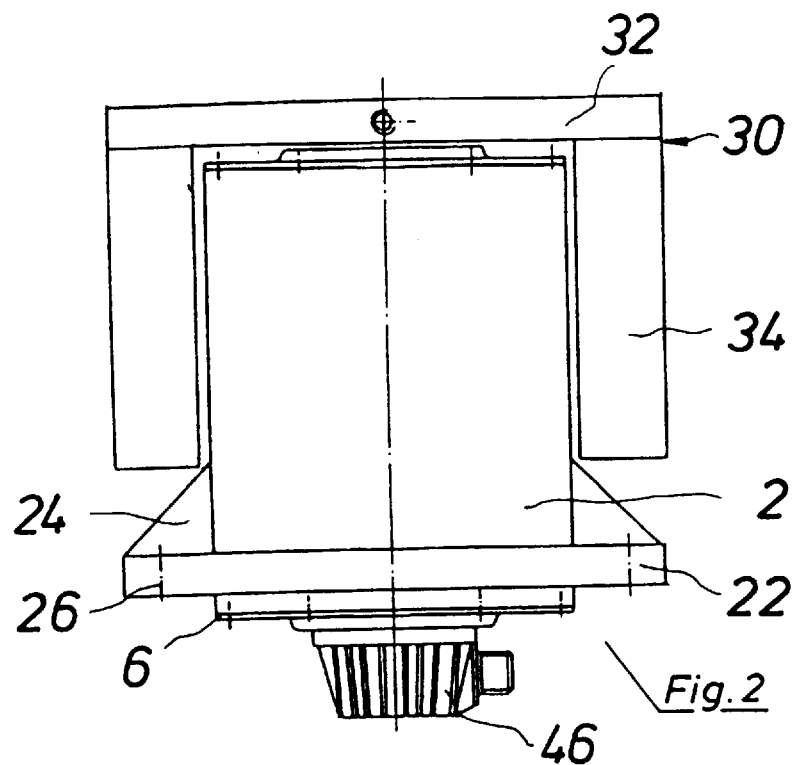
Figure 3:
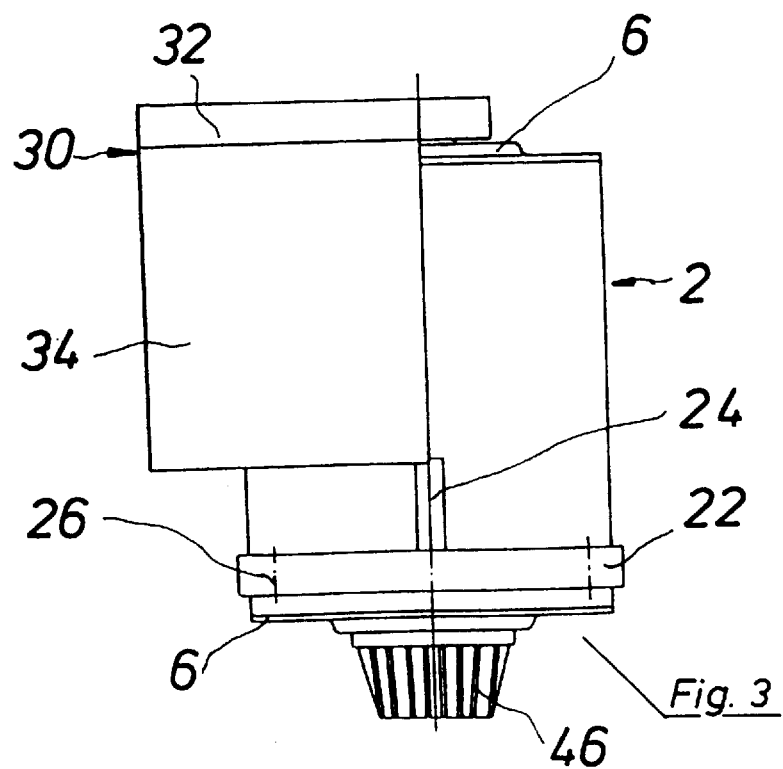

In the following, the invention is further described in more detail, by means of a preferred embodiment of an unbalance vibration generator or vertical installation, with the aid of the attached drawings. Shown in the drawings are the following:

FIG. 1, an axial cross-section through an unbalance vibration generator,

FIG. 2, a side view of the vibration generator in accordance with FIG. 1,

FIG. 3, a side view that has been rotated 90° with respect to FIG. 2, and

Figure 4:
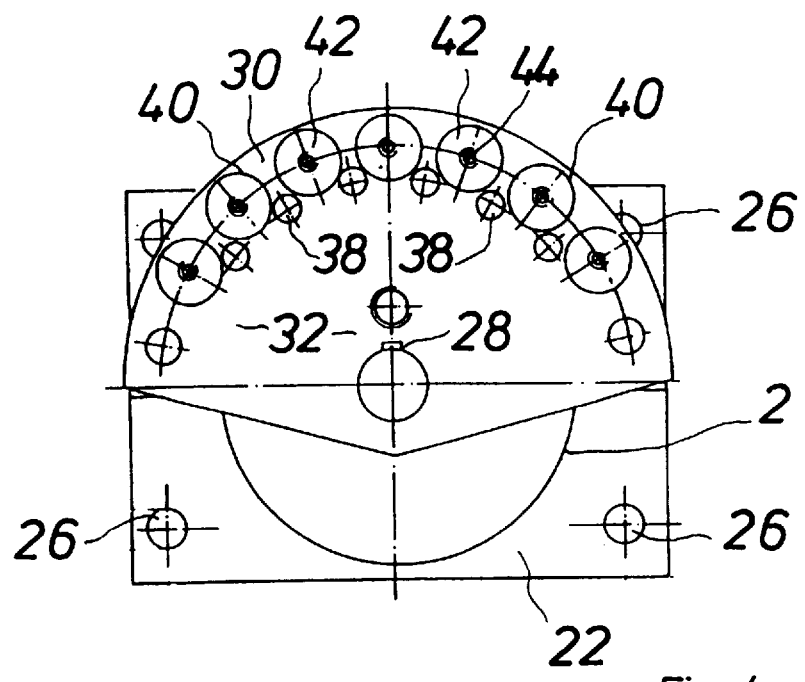

FIG. 4, a top view of the vibration generator in accordance with FIG. 1.

The motor-driven unbalanced vibration generator that is shown in cross-section in FIG. 1 exhibits a motor housing 2 with an essentially cylindrical housing jacket 4 and two housing covers 6 at the ends, each of which contains one rolling bearing 8. The housing jacket 4 contains in its interior stator pole shoes 10 which are surrounded by stator windings 12. Rotatably supported in the rolling bearings 8 is the motor's armature or rotor 14, which exhibits a rotor body 16 which is provided at its opposite ends with shaft journals 18 and 20, by means of which the armature 16 is supported in the bearings 8. At its lower end, the housing jacket 4 is provided with a circumferential flange plate 22, which is of a rectangular configuration in the embodiment and which is additionally supported with respect to the housing by means of stiffening ribs 24. In addition, the flange plate 22 is provided with screw holes 26 (FIG. 4) which are used for fastening the vibration generator at its installation site.

At the upper end of the upper shaft journal 18 there is placed an unbalanced body 30 which, as can be seen from FIG. 4, is joined with the shaft journal 18 in a non-rotating fashion by means of a key 28. The unbalanced body 30 exhibits a radial segment 32 which, as can be seen in FIG. 4, is, in essence, configured as a semi-circular disk which, however, has a triangular extension in the region of the center of the circle in order to have sufficient material available in the circle's center region for a bore for fastening it to the shaft journal 18. In addition, the unbalanced body 30 exhibits an axial segment 34, which is configured in a semi-cylindrical, cup-like shape, as can be seen especially well in the representations in FIG. 2 and FIG. 3, in which regard FIG. 3 is a view of FIG. 2 that has been rotated by 90°, with the unbalanced body 30 in the same position. In the embodiment, the axial segment 34 is joined by means of screw connections with a circular, ring-shaped circumferential segment 36 of the radial segment 32 of the unbalanced body 30 (FIG. 1), which segment lies radially outside. The screw holes 38 that have been provided for this purpose can be seen in the top view shown in FIG. 4.

From the drawn representations, it can be clearly seen that in the embodiment, the radial segment 32 of the unbalanced body 30 is configured as a disk with relatively little thickness, while by way of contrast, the thickness of the cylindrical cup portion of the axial segment 34 of the unbalanced body 30 is made significantly thicker and thus with a greater mass. This rotating mass of the axial segment 34 which lies relatively radially far outside determines the unbalance of the vibration generator to a critical extent. In addition, it can also be clearly seen, especially in FIGS. 1 and 2, that the axial segment 34 of the unbalanced body 30 extends beyond the longitudinal center of the housing jacket 4, and specifically, until it lies close to the stiffening ribs of the flange plate 22, as a result of which the rotational center of mass of the unbalanced body 30 is shifted to an axial region between the rolling bearings 8. In spite of the fact that the unbalanced body is cantilevered on one side, a relatively uniform loading of the two bearings 8 results.

It can be seen in FIG. 4 that the unbalanced body 30 exhibits a ring of recesses in the form of axial bores 40, only one of which is indicated by means of dashed lines in the cross-sectional representation of FIG. 1, in conjunction with which, for reasons of a simpler representation, its position does not exactly match one of the positions shown in FIG. 4. In the representation of FIG. 4, cylindrical additional masses 42 have been inserted in a fitting manner into the axial bores 40. Each of the additional masses 42 is provided at its upper end with a threaded bore 44, into which a grip can be screwed for the purpose of pulling out the additional masses.

The additional masses 42 are inserted loosely into the bores 40 and are not fastened in any special way, which is sufficient for a vertically installed position of the vibration generator. In addition, the additional masses 42 can be adjusted, and for example, in a given application, one or more additional masses can be fixed in one or more of the bores 40.

In accordance with FIG. 4, the bores 40 are arranged symmetrically with respect to the vertical center line of the unbalanced body 30 through which the mass plane of symmetry of the unbalanced body passes in a direction perpendicular to the plane of the drawing. By symmetrically filling the unbalanced body 30 with additional masses 42 on both sides of the plane of symmetry, the latter remains unchanged in its angular placement relative to the shaft journal 18.

The additional masses 42 do not have to extend over the entire length of the bores 40. If additional masses of half-length are chosen, which are positioned in the upper region of the bores 40 on one side of the mass plane of symmetry and in the lower position on the other side, wobbling motions can also be created by means of the vibration generator.

If heavy metals are used for the additional masses in the embodiment, the working moment of the vibration generator can be approximately tripled in comparison with operation without additional masses. If iron is used to the same extent for the unbalanced body as well as for the additional masses, one can gain an approximate doubling of the working moment if all of the bores 40 are filled with additional masses 42.

It can also be seen in FIGS. 2 and 3, that there is placed at the lower end of the vibration generator an angle of rotation sensor 46, which senses the angular position of the rotor 16, and thus the unbalanced body 30 as well, at the lower shaft journal 20. In the case of an oscillating drive with several vibration generators to form an oscillation with a specific direction, it is necessary that the angles of rotation of these multiple devices be appropriately synchronized in the rotation of their unbalanced masses. This is possible through the use of suitably controllable electric motors and is familiar to the specialist.

The electric motor-drive vibration generator shown is ideal for installation with a vertically oriented axis in appropriate working machines, since especially in the case of machines that require a vertical direction, it takes up little overall height, and any desired change in the unbalanced masses can be conveniently carried out just from above.

I claim:

1. A motor-driven unbalanced vibration generator comprising:

a motor housing provided with fastening means for fastening the vibration generator at its installation site, a rotor body of the motor, which is placed inside the motor housing in such a way that it can rotate and which is provided with one shaft journal at each of its opposite ends, at least one bearing for each of the shaft journals, in which the rotor body is supported by means of the shaft journals in such a way that said rotor body can rotate, and at least one rotatable unbalanced body on at least one of the shaft journals, which can be joined with the shaft journal in such a way that the unbalanced body cannot turn relative to said joined shaft journal, wherein the unbalanced body on the shaft journal includes a segment which lies radially outside and which extends axially over the motor housing and can rotate around said motor housing; wherein the center of inertia of each unbalanced body lies in an axial section plane along the axis of the shaft journals and between the bearings of the shaft journals which bearings are placed directly adjacent to the rotor body.

2. A vibration generator in accordance with claim 1, wherein each said segment comprises a radial portion which is essentially the shape of a partial sector of a circular disk, and which, for the purpose of fastening the unbalanced mass on the shaft journal also includes the circular disk center region, and an axial portion which extends over the housing in the axial direction and comprises a part of a cylindrical jacket which is joined on its one side with a circular external circumferential region of the radial segment.

3. A vibration generator in accordance with claim 1 or 2, wherein the bearing, of which there is at least one for each of the shaft journals is placed in one end of the housing and wherein at least one said shaft journal includes an extension which extends beyond at least one bearing, wherein the unbalanced body, of which there is at least one, is placed on at least one said shaft journal extension.

4. A vibration generator in accordance with any one of claims 1 or 2, wherein at least one unbalanced body is placed on only one of the shaft journals.

5. A vibration generator in accordance with any one of claims 1 or 2, wherein only one unbalanced body is placed on the shaft journal, of which there is at least one.

6. A vibration generator in accordance with claim 5, wherein the unbalanced body is configured so that it can be changed in its mass, in particular, in the axial portion of said segment.

7. A vibration generator in accordance with claim 6, wherein additional masses are provided which can be inserted in an axial direction into axial recesses of the axial segment portion of the unbalanced body, and wherein said additional masses can be fixed in these recesses if necessary.

8. A vibration generator in accordance with claim 7, wherein a majority of the axial recesses for additional masses are placed symmetrically around the unbalanced body with respect to a radial mass plane of symmetry of the unbalanced body.

9. A vibration generator according to claim 4, wherein the unbalanced body, of which there is at least one, extends with its axial segment portion beyond the longitudinal center of the housing, and the fastening means are provided in the vicinity of the other end of the housing.

10. A vibration generator according to claim 4, for vertical installation, wherein the unbalanced body, of which there is at least one, is placed in a cantilevered manner on an extension of the upper shaft journal and overlaps the housing in the downward direction, and wherein the fastening means is configured to comprise at least one of a flange that surrounds the lower end of the housing and the other of support consoles distributed around the circumference at the lower end of the housing with contact surfaces directed downward.

11. A vibration generator in accordance with at least one of claims 1 or 2, wherein the motor is an electric motor.

12. A vibration generator in accordance with at least one of claims 1 or 2, wherein a shaft journal, in particular, a shaft journal which does not carry an unbalanced body, is provided with an angle of rotation sensor.

* * * * *